United States Patent
Braun

(10) Patent No.: US 6,685,795 B1
(45) Date of Patent: Feb. 3, 2004

(54) DEVICE AND METHOD OF SEPARATING ADHERED LAYERS

(75) Inventor: Randolph B. Braun, Pleasant Lake, MI (US)

(73) Assignee: Adco Products, Inc., Michigan Center, MI (US)

( * ) Notice: Subject to any disclaimer, the term of this patent is extended or adjusted under 35 U.S.C. 154(b) by 169 days.

(21) Appl. No.: 09/927,716

(22) Filed: Aug. 10, 2001

(51) Int. Cl.⁷ .............................................. B32B 35/00
(52) U.S. Cl. ........................ 156/344; 156/584; 271/280
(58) Field of Search .............................. 156/344, 584, 156/579; 29/426.1; 271/280, 281, 285

(56) References Cited

U.S. PATENT DOCUMENTS

| | | | |
|---|---|---|---|
| 1,494,700 A | * 5/1924 | Nussbaum | 156/584 |
| 2,731,263 A | * 1/1956 | Baril, Jr. et al. | 271/285 |
| 3,017,179 A | * 1/1962 | Stuckens | 271/285 |
| 3,040,802 A | 6/1962 | Frazer | |
| 3,107,193 A | 10/1963 | De Neui et al. | |
| 3,128,219 A | * 4/1964 | Cummings | 156/556 |
| 3,468,743 A | * 9/1969 | Soriano | 156/584 |
| 3,477,896 A | * 11/1969 | Townsend et al. | 156/584 |
| 3,614,095 A | * 10/1971 | Beck et al. | 271/280 |
| 3,818,592 A | 6/1974 | Himeno | |
| 3,964,095 A | * 6/1976 | Kihara et al. | 360/81 |
| 4,334,945 A | 6/1982 | Raush | 156/344 |
| 4,855,012 A | * 8/1989 | Sumi | 156/584 |
| 4,980,011 A | 12/1990 | Gruber et al. | |
| 5,013,392 A | 5/1991 | Virgadamo | |
| 5,022,951 A | 6/1991 | Behlmer et al. | |
| 5,235,751 A | 8/1993 | Landgraf | |
| 5,240,546 A | * 8/1993 | Shiga | 156/378 |
| 5,312,501 A | 5/1994 | Gruber et al. | |
| 5,328,547 A | * 7/1994 | Boldrini et al. | 156/584 |
| 5,333,967 A | 8/1994 | Foley et al. | |
| 5,367,762 A | * 11/1994 | Disko et al. | 29/764 |
| 5,482,182 A | 1/1996 | Thompson et al. | |
| 5,498,305 A | * 3/1996 | Mailloux | 156/249 |
| 5,641,378 A | 6/1997 | Luhman et al. | |
| 5,948,201 A | 9/1999 | Alveskog | |
| 6,158,493 A | 12/2000 | Hildebrand et al. | |
| 6,444,082 B1 | * 9/2002 | Campbell et al. | 156/344 |

OTHER PUBLICATIONS

IBM Technical Disclosure Bulletin, vol. 25, No. 11B, Label Adhesive–Back Release Tool, R. Pollard, Apr. 1983.*

* cited by examiner

Primary Examiner—Mark A. Osele
(74) Attorney, Agent, or Firm—Dinsmore & Shohl LLP

(57) ABSTRACT

A device and method for separating adhered layers such as a pressure sensitive adhesive and release liner is provided. The device is comprised of a base including a hook extending from the surface of the base which is adapted to engage one of the adhered layers and allow separation of the layers. In use, the device may be used to separate an adhesive and release liner by positioning the adhered layers in the channel of the device until the adhesive engages the hook such that the release liner may be grasped and pulled away from the adhesive.

12 Claims, 4 Drawing Sheets

DEVICE AND METHOD OF SEPARATING ADHERED LAYERS

BACKGROUND OF THE INVENTION

The present invention relates to a device for separating adhered layers, and more particularly, to a device and method used to separate an adhesive and release liner in a pressure sensitive adhesive tape.

Pressure sensitive adhesive tapes such as single- and double-sided tapes are well known in the art. Single-sided adhesive tapes generally comprise an adhesive which is adhered on one side to a protective release liner typically comprised of plastic or paper, while double-sided adhesive tapes comprise a two-sided adhesive tape which is adhered on one or both sides to a release liner. The tapes are typically wound in a roll until ready for use. A selected length of the tape is unwound followed by removal of the release liner(s) immediately prior to application to a desired substrate. Because of the high degree of adhesion between the adhesive and the release liner, the initial removal of tape from the liner can sometimes be difficult.

A number of hand-held devices have been developed to facilitate the separation of an adhesive layer adhered to a protective release liner. For example, a hand tool described in U.S. Pat. No. 3,040,802 includes a sharp beveled point for separating a backing material from an adhesive. Another hand held tape liner removal tool is described in U.S. Pat. No. 6,158,493, and includes an elongated strip of metal and a sharpened edge.

However, there is still a need for a hand-held device for facilitating separation of adhered layers such as an adhesive and release liner which is reliable and convenient to use.

SUMMARY OF THE INVENTION

The present invention meets that need by providing a hand-held device for separating adhered layers such as an adhesive layer and a release liner comprising an adhesive tape. The device includes a hook which engages the adhesive layer of the tape and allows the release liner to be easily separated from the adhesive. According to one aspect of the present invention, a device is provided for separating a first adhered layer from a second adhered layer. The first adhered layer preferably comprises a pressure sensitive adhesive, and the second adhered layer preferably comprises a release liner. The device comprises a base including a hook extending from a surface of the base and adapted to engage one of the adhered layers as the hook and adhered layers are moved relative to one another. The hook is preferably comprised of metal.

The base of the device preferably includes a channel in one surface in which the hook is positioned. The first adhered layer preferably has a width which is equal to or less than the width of the channel so as to allow the adhesive to be guided through the channel.

Preferably, the base portion of the device is adapted to be grasped in the hand of a user and includes opposing side portions having depressions therein to facilitate grasping.

The device may be used to separate the first and second adhered layers by moving the hook and adhered layers relative to one another such that the hook engages one of the adhered layers, separating the layers. Where the first adhered layer comprises a pressure sensitive adhesive and the second adhered layer comprises a release liner, the adhered layers are preferably positioned in the channel of the base and moved along the channel until an edge of the pressure sensitive adhesive engages the hook. The release liner may then be pulled away from the adhesive.

Accordingly, it is a feature of the present invention to provide a device and method for separating adhered layers such as a pressure sensitive adhesive and release liner. Other features and advantages of the invention will be apparent from the following description, the accompanying drawings, and the appended claims.

DETAILED DESCRIPTION OF THE PREFERRED EMBODIMENTS

Figure 1:
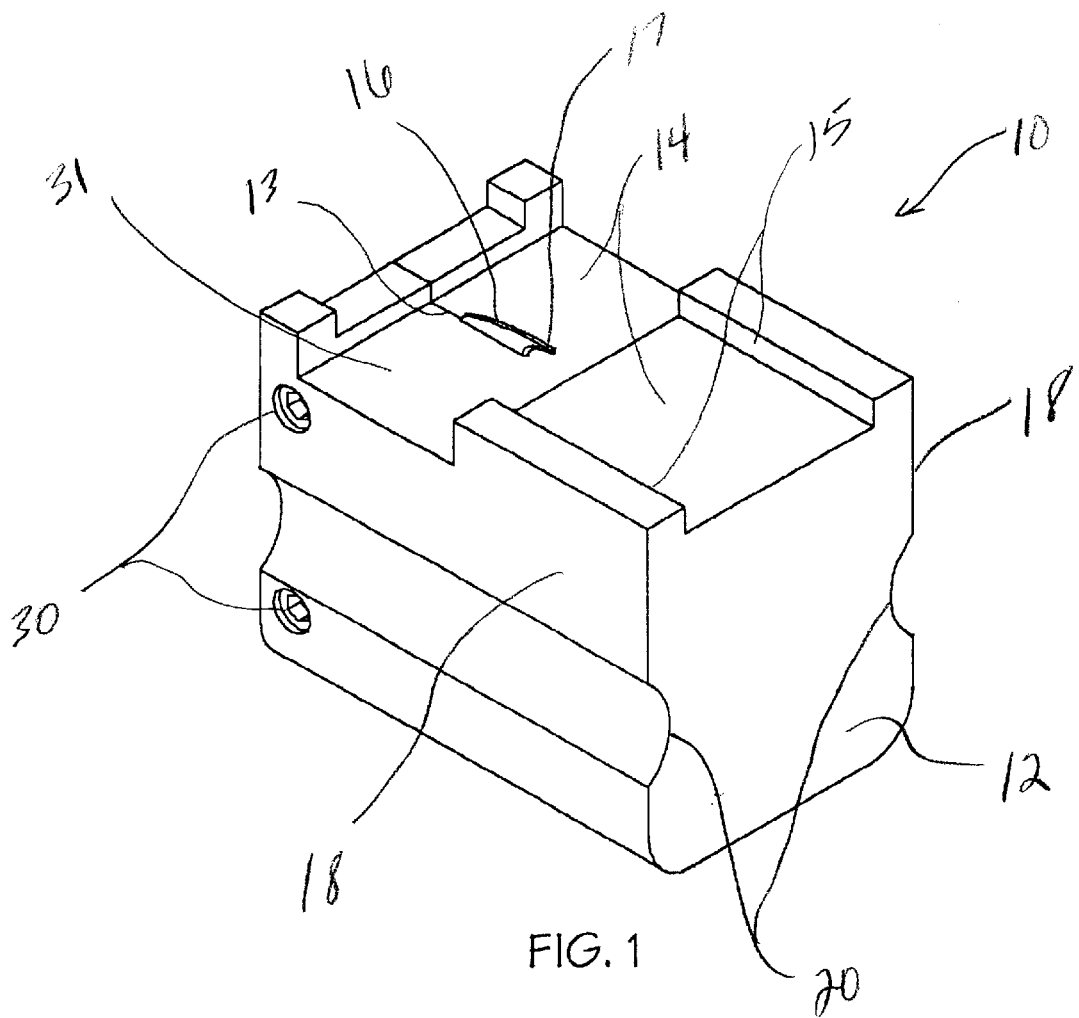
FIG. 1 is a perspective view of the device of the present invention.
Figure 2:
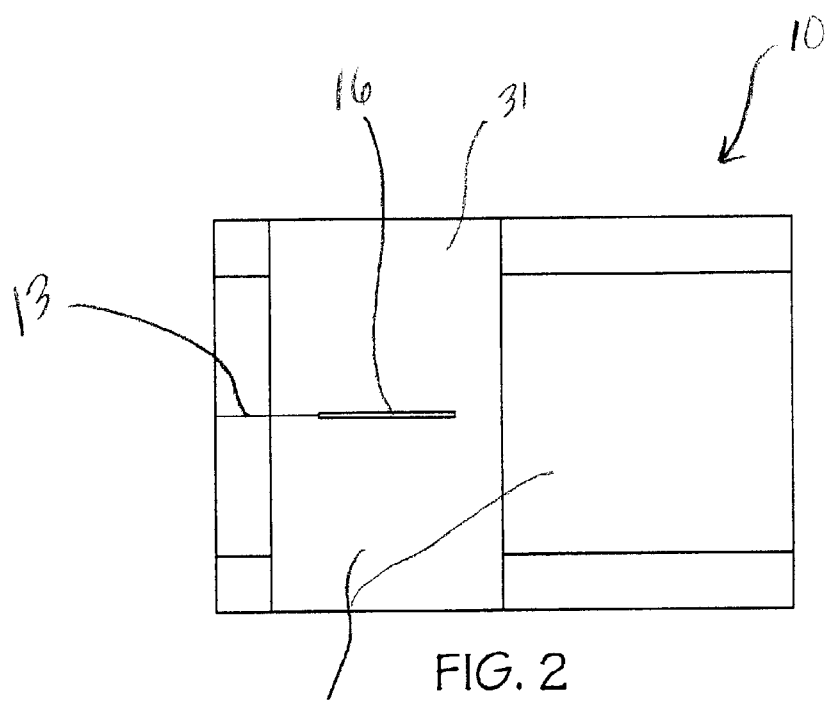
FIG. 2 is a top view of the device shown in FIG. 1.
Figure 3:
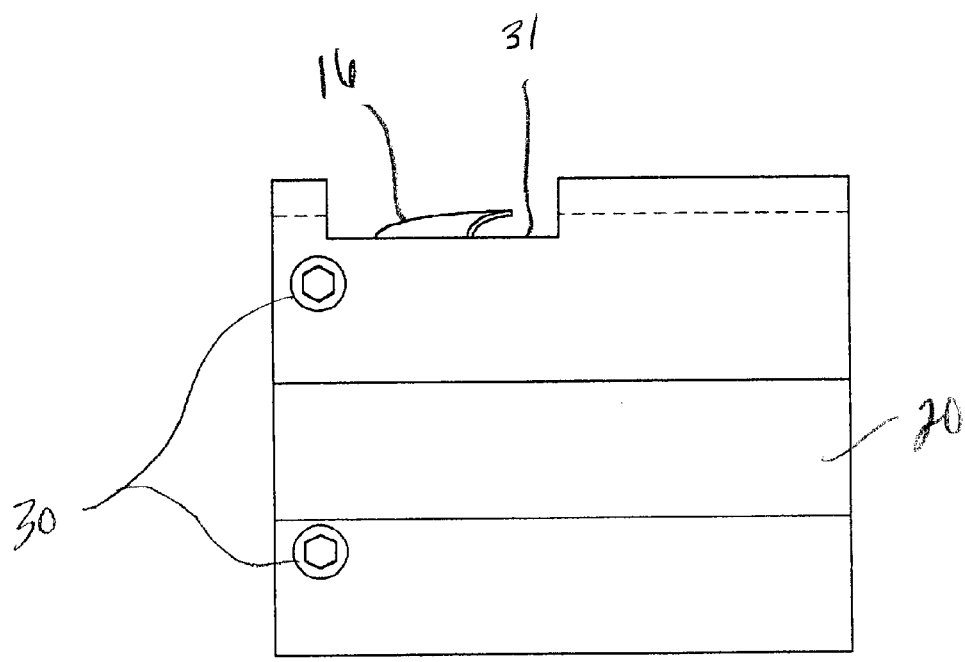
FIG. 3 is a left side view of the device shown in FIG. 1.
Figure 4:
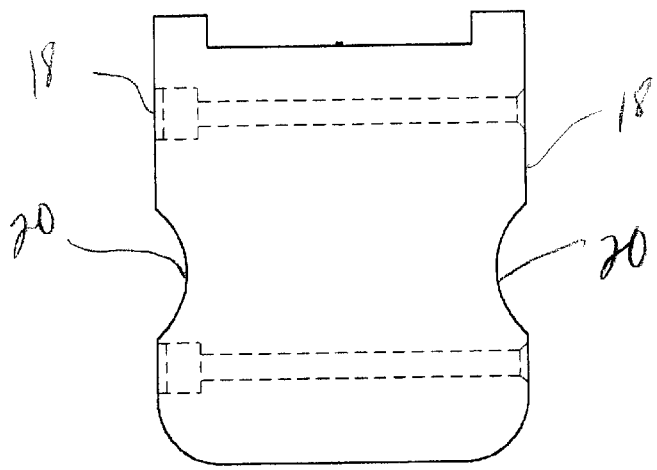
FIG. 4 is a rear view of the device shown in FIG. 1.
Figure 5:
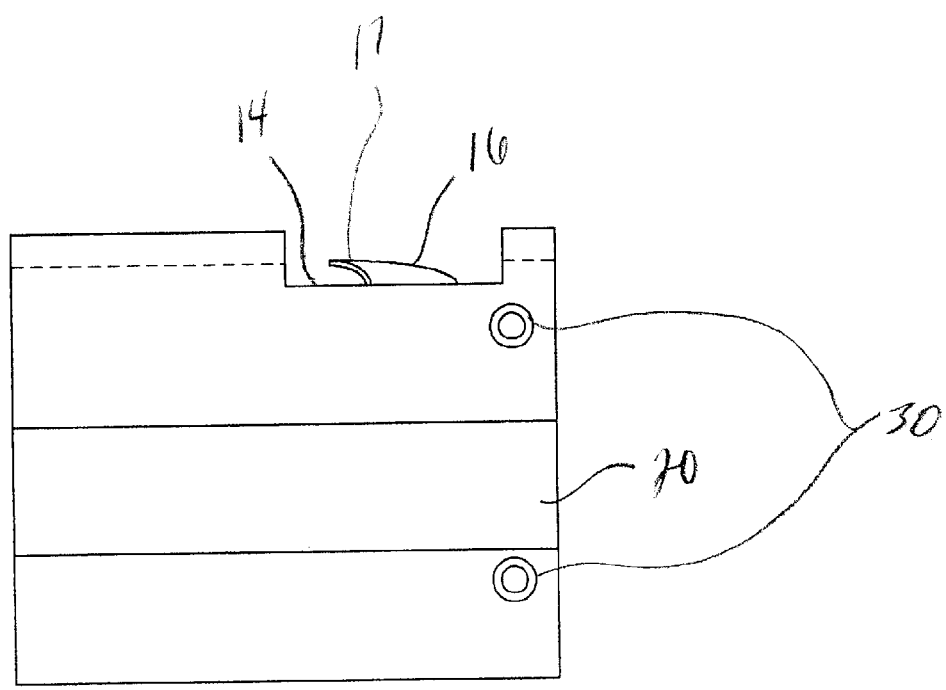
FIG. 5 is a right side view of the device shown in FIG. 1.

Referring now to FIGS. 1–5, a device 10 for removing adhered layers is shown. The device includes a base 12 including a channel 14 in which a hook 16 is positioned. The hook is preferably positioned in a slit 13 in the base and is held in place by screws 30 exerting a compressing force.

The channel 14 of the base includes opposing sidewalls 15 which aid in guiding the pressure sensitive adhesive tape as it comes into contact with the hook. The channel 14 further includes a sight channel 31 which, in conjunction with screws 30, allows a user to adjust the hook to the desired height, depending on the thickness of the tape which is to be separated.

The base 12 is preferably comprised of plastic, wood or metal, and includes opposing side portions 18 having depressions 20 therein to facilitate grasping by a user. It will be apparent to those skilled in the art that grasping of the device may be facilitated by other means, such as, for example, a roughened or knurled surface. The hook 16 is preferably comprised of a metal such as stainless steel, and is formed so as to provide a sharpened leading edge 17 for engaging one of the adhered layers. Other materials of construction may be used for hook 16 as long as such materials can be formed to have a relatively sharp leading edge.

Figure 6:
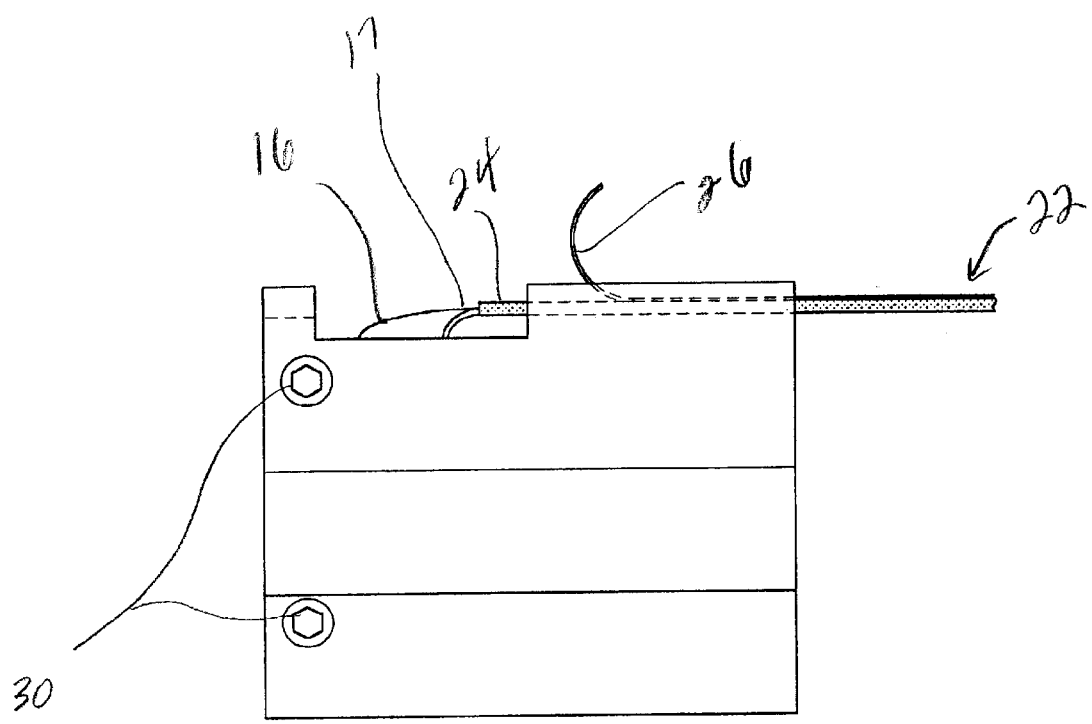
FIG. 6 is a side view of the device illustrating separation of two adhered layers.

FIG. 6 illustrates the device 10 being used to separate the adhered layers of a pressure sensitive adhesive tape 22 comprising an adhesive layer 24 and a release liner 26. The pressure sensitive adhesive tape preferably has a width which is equal to or less than the width of the channel 14 in the base so that it maybe easily guided to engage the hook 16. In use, a user may easily grasp the device with one hand at the depressions 20 of the base while guiding the adhesive tape with the other hand along channel 14 until the leading edge 17 of hook 16 comes into contact with and engages the end of the adhesive layer 24 as shown. When the hook engages the adhesive layer 24, the liner 26 can be easily grasped and stripped away from the adhesive as shown.

As will be appreciated, the leading edge 17 of the hook 16 is preferably positioned on the floor of the channel 14 at a height which allows engagement of the adhesive layer 24. should be appreciated that while the device of the present invention has been described for use in removing a release liner from an adhesive layer, the device may also be used to remove other adhered materials.

It will be apparent to those skilled in the art that various changes may be made without departing from the scope of the invention which is not considered limited to what is described in the specification.

What is claimed is:

1. A device for separating a first adhered layer from a second adhered layer comprising a base including a hook extending from a surface of said base and adapted to engage one of said adhered layers as said hook and adhered layers are moved relative to one another; wherein said base portion of said device is adapted to be grasped in the hand of a user.

2. A device as claimed in claim 1 in which said first adhered layer comprises a pressure sensitive adhesive.

3. A device as claimed in claim 1 in which said second adhered layer comprises a release liner.

4. A device as claimed in claim 1 in which said hook may be adjusted to different heights.

5. A device as claimed in claim 1 wherein said base includes a channel in one surface thereof, and said hook is positioned in said channel; and wherein said first adhered layer comprises a pressure sensitive adhesive having a width which is equal to or less than the width of said channel.

6. A device as claimed in claim 1 in which said base portion includes opposing side portions, said opposing side portions including depressions therein to facilitate grasping of said device by a user.

7. A device as claimed in claim 1 wherein said hook is comprised of metal.

8. A method of separating a first adhered layer from a second adhered layer, said second adhered layer comprising a release liner, said method comprising providing a device including a base having a hook extending from a surface of said base and moving said hook and said adhered layers relative to one another such that said hook engages one of said adhered layers, separating said layers.

9. A method as claimed in claim 8 in which said first adhered layer comprises a pressure sensitive adhesive.

10. A method of separating a pressure sensitive adhesive layer from a second adhered layer comprising providing a device including a base having a channel in one surface thereof and having a hook extending from a surface of said base and positioning said adhered layers in said channel and moving said adhered layers along said channel such that said hook engages said pressure sensitive adhesive layer, separating said layers.

11. A method as claimed in claim 10 wherein said second adhered layer comprises a release liner, said method including the step of pulling said release liner away from said pressure sensitive adhesive.

12. A device for separating a first adhered layer from a second adhered layer comprising a base including a slit therein and a hook positioned in said slit and extending from said base, wherein said hook is adapted to engage one of said adhered layers as said hook and adhered layers are moved relative to one another; wherein said base portion of said device is adapted to be grasped in the hand of a user.

* * * * *